United States Patent Office 2,872,284
Patented Feb. 3, 1959

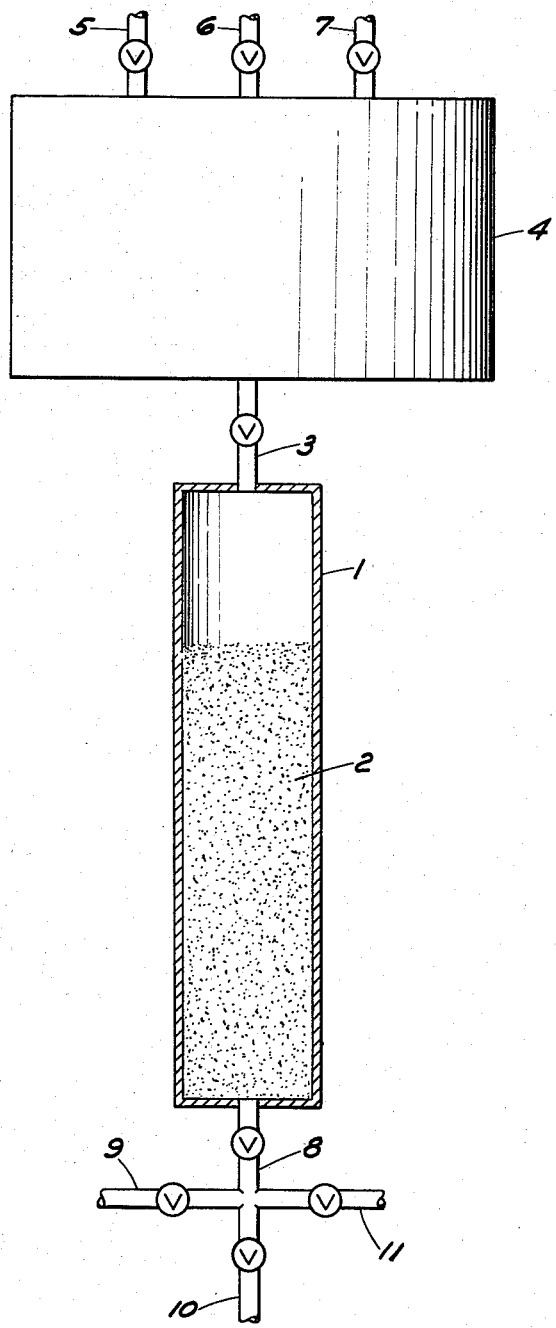

2,872,284

RECOVERY OF PROTACTINIUM

Kurt A. Kraus, Oak Ridge, and George E. Moore, Martel, Tenn., assignors to the United States of America as represented by the United States Atomic Energy Commission Application March 8, 1950, Serial No. 148,314

5 Claims. (Cl. 23—14.5)

The present invention relates in general to a protactinium recovery process, and more particularly to an anion-exchange adsorption process for the separation and selective recovery of protactinium values, especially when present in trace concentrations, from aqueous solutions containing the same, and from dissolved materials, such as thorium and uranium, associated therewith.

It is to be understood that the terms protactinium, thorium, and uranium, are used herein to designate those elements generically, whether in the elemental state or combined as compounds, or whether in natural isotopic proportion, or solely a particular isotopic species, unless otherwise indicated by the context.

As is known, there are various important operations in the art which require the selective recovery of protactinium values, particularly in the isolation of such values from admixtures with extraneous materials, and also in their concentration from aqueous solutions. Among these, the generally more difficult are those wherein small, even as little as trace, amounts of protactinium must be separated from much larger masses of thorium and often from quantities of uranium as well. Such difficult separation is necessary, for example, in procedures for the derivation from thorium of certain valuable $\beta$-emitting isotopes of protactinium, in particular $_{91}Pa^{233}$, $_{91}Pa^{234}$, and $_{91}Pa^{232}$. Having short half-lives, these isotopes are valuable as radioactive tracers. In addition, however, they are often even more valuable as sources of isotopically-isolated, long-lived, $\alpha$-emitting uranium isotopes of the same respective atomic mass numbers, formed by the $\beta$-decay of the protactinium isotopes. Such separation is also necessary in the derivation of valuable $\alpha$-emitting $_{91}Pa^{231}$, a Pa isotope of natural occurrence, in its currently expedient nuclear synthesis from isolated $Th^{230}$. These particular protactinium isotopes are each conventionally generated in substantial isotopic purity by subjecting thorium, in either metallic or salt form, to a different specific nuclear transmutation reaction. In each case, it is generally feasible to transmute only a minor portion of the thorium reactant, and thereafter recover and isolate the small amount of protactinium isotope from the remaining mass of thorium.

Considering each of these isotopes in more detail, $Pa^{233}$ is customarily produced by irradiation of natural thorium (about 100% $Th^{232}$) with slow neutrons, preferably those generated in a nuclear fission reactor, according to the known, conventionally-represented reaction scheme:

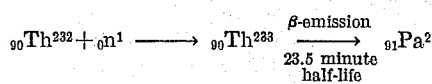

The produced $Pa^{233}$, a beta-emitter, 27.4 days half-life, decays to the fissionable $U^{233}$ isotope of uranium. The isolation of $Pa^{233}$ produced in this manner, and the subsequent decay thereof to $U^{233}$, constitutes an operation of great importance as the basis for a large-scale method for the production of $U^{233}$ as a neutronic reactor fuel.

$Pa^{234}$ occurs as an ultimate natural decay product of $_{92}U^{238}$ in accordance with the following scheme:

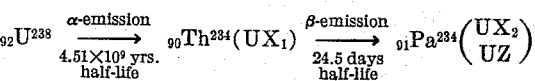

To produce $Pa^{234}$, the small content of $_{90}Th^{234}$ found associated with natural uranium, as a result of this decay over the ages, is isolated therefrom, ordinarily by procedure which involves the addition of relatively large amounts of natural thorium ($Th^{232}$) as a carrier in the concentration of $Th^{234}$ from solution. Later after a suitable $Th^{234}$ decay period, the ensuant $Pa^{234}$ decay product is separately recovered from the bulk of the associated thorium. $Pa^{234}$, a beta-emitter, decays to $U^{234}$, valuable as a short-lived $\alpha$-emitting radioactive tracer.

$Pa^{232}$ is produced by bombarding $Th^{232}$ with deuterons, preferably from a charged particle accelerator, such as a cyclotron or Van de Graff generator, to effect the reaction:

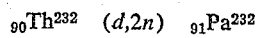

or by the neutron bombardment of isolated $Pa^{231}$:

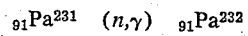

The produced $Pa^{232}$ is a relatively short-lived beta-emitter, decaying to $U^{232}$, valuable as a moderately long-lived radioactive tracer.

$Pa^{231}$ may be prepared by neutron-irradiation of isolated ionium ($Th^{230}$) with neutrons, and permitting the resulting $Th^{231}$ to $\beta$-decay to $Pa^{231}$:

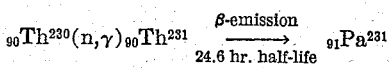

$Pa^{231}$ is an $\alpha$-emitter, of $3 \times 10^4$ years half life.

All of these exemplary Pa-isotope production processes require, in common, the separate recovery of small amounts of protactinium from large amounts of thorium. Protactinium recovery has been accomplished in the past by the selective carrier precipitation, with a manganese dioxide precipitate as the carrier, of the protactinium from aqueous solutions (cf. Journal of the American Chemical Society 57, page 438 (1935)). Another previously conventional method, more recently devised and of demonstrated high efficacy, is that described in co-pending application Ser. No. 570,803, filed December 30, 1944, in the name of Raymond W. Stoughton, now Patent No. 2,856,262, issued October 14, 1958. As disclosed, Stoughton's method for the separation of trace quantities of Pa from Th is an adsorption-specific elution process which comprises essentially the adsorption of Pa and Th from an aqueous 1 N $HNO_3$ solution onto a bed of cation-exchange adsorbent, elution of Th with 2–5 N $HNO_3$, and separate elution of Pa with 0.1 N $NH_4F$. While these earlier processes have proven successful, applicants have devised a new and different process for the purpose, which has significant practical advantages thereover.

Accordingly, one object of the present invention is to provide a new and improved process for the selective recovery of protactinium.

Another object is to provide such a process for the separation and selective recovery of protactinium values from aqueous solutions containing the same together with contaminating materials, including thorium and uranium.

Still another object is to provide such a process which is efficacious in the separate recovery of trace amounts of protactinium from association with macroscopic bulks of thorium.

A further object is to provide such a process which effects, in conjunction with separation and selective recovery of protactinium values, also separate recovery of thorium values and of uranium values originally associated with the protactinium values.

Still a further object is to provide such a process which effects a high degree of separation and is highly efficient in protactinium recovery.

Yet another object is to provide such a process which may be effected simply and rapidly, and wherein the recovered values are derived in the form of readily-utilizable simple aqueous solutions thereof.

Yet a further object is to provide such a process wherein only a single aqueous reagent at adjusted concentrations serves as the efficient means for effecting the separation and selective recovery of protactinium values, as well as thorium and of uranium present.

Additional objects will appear hereinafter.

Applicants have discovered that although protactinium, being a metallic element, is usually cationic when in dissolved ionized form in aqueous solution, it nevertheless unexpectably assumes anionic properties under certain particular conditions. More particularly, it has been found that protactinium is weakly adsorbed by conventional anion-exchange adsorbents from aqueous HCl solutions thereof having HCl concentrations less than approximately 4 molar, and that with HCl concentrations above that point protactinium is very strongly adsorbed. Protactinium adsorbability increases markedly and abruptly with the HCl concentration of its solution starting at about 4 molar. It was further discovered that under similar conditions, virtually no adsorption of thorium occurs, even with very high HCl concentrations in the solution; evidently the thorium is not similarly rendered anionic by HCl. However, uranium, when in the dissolved hexavalent (uranyl) state, under similar conditions, was found to be likewise adsorbed from aqueous HCl solutions. In this regard, it has become evident that, in general, at least in the presence of HCl concentrations within the range of about from 3 to 4 molar, uranium is adsorbed substantially more strongly than is protactinium. These discoveries serve as the basis for the processes of this invention.

In accordance with the present invention, protactinium values may be recovered from an aqueous solution containing the same by the process which comprises rendering the solution acidic with hydrochloric acid, thereupon contacting the solution with an anion-exchange adsorbent, thereby effecting the adsorption of protactinium values upon the adsorbent, and thereafter separating the protactinium-bearing adsorbent from contact with the solution. While HCl concentrations below 4 molar render Pa somewhat adsorbable and so may be operatively employed in this adsorption operation, preferably the HCl concentration should be greater than 4 molar so as to take advantage of the very strong Pa adsorption which obtains at these higher HCl concentrations. Eminently satisfactory results have been obtained by using HCl concentrations within the preferred range of approximately 4 to 11 molar, especially at 8 molar. After separating the adsorbent from contact with the original solution, the adsorbed protactinium values may be desorbed by washing the adsorbent with an agent wherein the adsorbed protactinium values become cationic, neutral, or only very weakly anionic; <4M HCl solutions have proven eminently satisfactory for this purpose. In this regard, it has been discovered that aqueous HCl solutions, even with HCl concentrations far above 4 molar, when also containing HF in virtually any concentration (e. g. (9)M HCl+(0.004)M HF) will satisfactorily elute Pa from the adsorbent. It is preferred that the eluting solution employed have a pH in the acid range to avoid any interfering hydrolytic effects which may ensue at higher pH's.

Since thorium ions, if present in the HCl-acidified protactinium solution, are not adsorbed to any significant extent, they remain behind in solution upon the removal of the protactinium-bearing adsorbent. In this manner protactinium is separated and selectively recovered from thorium, in accordance with the present invention. The contacting of the original solution, after HCl incorporation, with the adsorbent may be satisfactorily effected by merely slurrying the adsorbent with the solution, whereupon the adsorbent may then be separated by such standard methods as filtration, decantation, centrifugation, and the like. However, a simpler, preferred method comprises merely percolating the solution through a bed of the adsorbent. In this method, the spent solution directly drains from the bed, thus automatically effecting its separation from contact with the adsorbent; elution of adsorbed protactinium is thereupon simply effected by percolation of the wash solution through the bed.

In further accordance with the present invention, protactinium values and hexavalent uranium values may be separated and selectively recovered from an aqueous solution containing the same by an adsorption-chromatographic elution process which comprises establishing in the solution an HCl concentration in excess of approximately 4 molar, thereupon percolating the solution, in a single direction, through a bed of anion-exchange adsorbent, thereby effecting adsorption of protactinium values and uranium values upon the adsorbent bed, thereafter percolating through the adsorbent bed, in the same direction as the flow of solution during adsorption, an aqueous HCl solution which will elute adsorbed Pa through the bed at a faster rate than adsorbed U; e. g. an HCl solution of concentration within the approximate range of 3 to 4 molar, thereby separately chromatographically eluting, in succession, protactinium and then uranium values from the bed, and separately collecting the protactinium-rich and the uranium-rich fractions of eluate. Again, if thorium ions are present in the original solution, they pass unadsorbed through the bed with the original solution, and accordingly the adsorbed protactinium and uranium values are thus each selectively separated therefrom.

The solutions of protactinum which may be treated in accordance with the subject invention are subject to wide variation. Particularly when adsorption is effected at HCl concentrations above 4M, the efficacy of the adsorption operation has been found to be substantially insensitive to the concentrations of the various solutes present in the initial solution. Advantageously, no difficulty has been observed upon adsorbing Pa from solutions having concentrations of Th and extraneous materials, such as NaCl and the like, well in excess of 1M. Of course, the solutions shold be free from deleterious concentrations of extraneous substances which tend to hinder the adsorption of Pa or U, as by forming soluble complexes therewith, or tend to render solutes other than Pa and U adsorbable, as by forming soluble anionic complexes therewith. Likewise, excess acidity or alkalinity of the solution should preferably be avoided or mitigated prior to establishing the proper HCl concentration conditions in the solution. In instances where the desired protactinium is originally contained in a solid medium, suitable solutions of this nature may readily be prepared by conventional dissolution means. For instance, when the Pa-containing medium is a mass of thorium metal, or a thorium salt such as the hydroxide or carbonate, as normally obtain in the aforesaid Pa-isotope production operations, dissolution may be readily effected in nitric acid, followed by fuming to remove the bulk of excess nitrate ions particularly to avoid undesirable oxidation of resin, and dilution with water. However, dissolution in HCl is preferred where possible, in that the necessary HCl incorporation in the solution is simultaneously effected.

Adsorption, in the present processes, is effected upon anion-exchange adsorbents, that is, adsorbents having loosely bound anionic radicals which are readily exchanged for similarly charged ions of the substances being adsorbed. Among the various types of conventional anion-exchange adsorbents, those which comprise synthetic resinous material containing quaternary amine radicals as the active exchange groups have proven to be eminently suited for the purpose. The preferred adsorbent of this type is Dowex A-1 (manufactured by Dow Chemical Company, Midland, Michigan) a polystyrene divinyl benzene polymer with quaternary amines as the active exchange groups. The adsorbent used should be rather finely divided; preferably finer than 50 U. S. mesh.

The accompanying drawing diagrammatically illustrates a system which may be utilized for conducting the processes of this invention. Referring to the drawing, a closed, vertical column 1, containing a bed of comminuted anion-exchange adsorbent 2, has connected to its top a valved feed pipe 3, leading from a solution make-up tank 4, disposed above it. The make-up tank 4, is served by valved pipes 5, 6, and 7, for introducing protactinium solution, HCl, and water, respectively. A throttle-valved exit pipe 8 leads from the bottom of column 1 and branches into three valved recovery pipes 9, 10, and 11, for conducting particular effluent liquids from column 1 to their desired destination.

In the operation of the illustrated system, appropriate solutions are prepared, in succession, in make-up tank 4, with the valve in feed pipe 3 closed, by introduction of the proper liquids through pipes 5, 6, and 7. By suitable regulation of the valves, each solution, so prepared, is drained through feed pipe 5 into the column 1, where it percolates through the adsorbent bed 2, leaves the column through exit pipe 8, and is passed out of the system through an appropriate one of the recovery pipes 9, 10, 11. Flow rate of the percolating liquids is controlled by adjustment of the throttle valve in exit pipe 8. First, the protactinium solution is introduced through pipe 5 into the make-up tank 4, where it is properly acidified with HCl, and is then percolated through the adsorbent bed 2, where protactinium, and uranium if present, are adsorbed. Upon draining from bed 2, the solution, depleted in protactinium and uranium, but still containing substantially all of whatever thorium it originally contained, leaves column 1 through exit pipe 8, and is passed out of the system through recovery pipe 9 to further processing, storage, or waste. Subsequently, a suitable eluant, such as <4M HCl solution, is prepared in make-up tank 4, percolated through the bed 2, where it elutes adsorbed protactinium, and uranium if present, and leaves the column 1 through exit pipe 8. The protactinium-containing eluate is routed through recovery pipe 10 to storage or further protactinium processing.

In the event that chromatographic separation of adsorbed protactinium and uranium is required, the eluant, in this case a 3 to 4 molar HCl solution, is slowly percolated through the bed 2, preferably at a rate of about 3 to 6 cu. in./sq. in./min., whereupon protactinium and uranium, originally adsorbed at the top of the bed, migrate downward through the bed, continuously being adsorbed and desorbed at each increment of adsorbent along the way. Because of their different characteristic affinities for the adsorbent under the elution conditions, each of the two species migrates downward at a different specific rate, and accordingly, each resolves itself into a separate, narrow, travelling band, with the protactinium band preceding the uranium band. As the protactinium band leaves the bed, the fraction of eluate containing it is routed out through recovery pipe 10. Later, when the uranium band leaves the column, an appropriate valve change is effected to route the uranium-bearing eluate out through recovery pipe 11.

Further illustration of the quantitative aspects and preferred procedure of the process of this invention is provided in the following specific examples. Example I demonstrates the efficacy of the process for separating trace concentrations of protactinium from a macroscopic bulk of thorium, under conditions and in relative amounts normally encountered in the Pa isotope production operations referred to hereinbefore.

EXAMPLE I

To an 8M HCl solution containing in 0.5 molarity ca. 33 mg. $ThCl_4 \cdot 8H_2O$, together with $4 \times 10^6$ counts/minute of $Pa^{233}$, was added ca. $2.4 \times 10^5$ disintegrations/minute of ionium ($Th^{230}$) to facilitate radiometric analysis for thorium. This solution was then percolated through a column 15 cm. long and 2 mm. in diameter filled with 200–230 mesh Dowex A-1 anion-exchange adsorbent, which had previously been thoroughly washed with 8M HCl. The addition of this feed solution to the column was contiguously followed by percolation of additional 8M HCl therethrough, all at a rate of ca. 0.2 ml./cm.$^2$/sec. A continuous radiometric analysis of the eluate indicated that substantially all of the thorium was eluted virtually immediately upon the effluence of the original solution. Thorium was not detectable in eluate fractions beyond the 12th column-void volume (column-void volume, the maximum volume of liquid containable in the adsorbent-filled column, was estimated to be 0.3 ml.). After the effluence of the 15th column-void volume, the Pa was found, by externally probing the column with a beta-ray-detector, to be still in a narrow band at the top of the column. 8M HCl washing was continued until 30 column-void volumes had been evolved, with still no change in the Pa position. Then elution with 1M HCl was commenced, at the same rate of percolation through the bed. The Pa band immediately began migration down the column. Pa withdrawal commenced in the 38th column-void volume of effluent; the bulk of the Pa was very sharply eluted in the following milliliter of effluent. Elution of the remainder of adsorbed Pa continued and was essentially complete by the 75th column-void volume. Radiometric determination revealed that essentially 100% of the initial thorium activity was present in the first 12 column-void volumes of eluate, and essentially 100% of the initial protactinium activity was present in the eluate fractions between the 38th and 75th column volumes, inclusive. Accordingly, each of the separated elemental species was radiometrically pure of the other, and recovery of both was quantitative.

The simplicity and efficacy of this process become immediately apparent from the results of Example I. In this regard, it is to be remembered that the Pa here was in trace concentrations in the presence of a macroscopic bulk of Th, a concentration ratio probably the most unfavorable to successful selective adsorption of Pa without excessive Th contamination. Accordingly, complete separation of Pa should be even more readily effected with relative concentrations less widely divergent, say where both Pa and Th are macroscopic. The high selectivity for Pa evidenced in this example makes simple batch separation, involving slurrying and subsequent removal, of an amount of adsorbent with the Pa-Th-HCl solution, feasible as a rapid alternative procedure for conducting the process. The wash of the adsorbent with a few columns-void volumes of >4M HCl following the initial adsorption operation, employed in the example, has been found generally preferable in that it beneficially purges any remaining initial solution from the bed, thus preventing Th contamination of early Pa eluate fractions.

Example II, following, illustrates the more difficult chromatographic separation of protactinium and uranium, following initial separation of both from thorium. Again the separation was effected upon trace concentration of Pa in the presence of a macroscopic bulk of thorium, the circumstance normally encountered in Pa isotope production.

EXAMPLE II

A 8M HCl solution of $ThCl_4$, $Pa^{233}$, and $Th^{230}$, essentially identical with the solution prepared in Example I, but also containing 80 micrograms of uranium as $UO_2Cl_2$, together with $1 \times 10^6$ counts/minute of $U^{233}$ to facilitate radiometric analysis for U, was provided. As in Example 1, the solution was percolated through a 15 cm. x 2 mm. diameter column filled with 200–230 mesh Dowex A–1, previously thoroughly washed with 8M HCl, and immediately followed by additional 8M HCl, again all at 0.2 ml./cm.$^2$/sec. As before, all thorium was eluted immediately with the first few column-void volumes of effluent. After about 30 column-void volumes of 8M HCl, the Pa and U were found to have remained in a narrow band at the top of the column. Then percolation of 3.8M HCl through the bed was commenced, whereupon the Pa band proceeded slowly downward through the column, with the U band following. Pa elution commenced at about the 5th column-void volume of 3.8M HCl effluent, reached maximum intensity in the 12th and 13th column-void volumes, and was over 90% complete by the 35th column-void volume of 3.8M HCl. U elution commenced with the 38th volume, reached maximum intensity in the 43rd, and was essentially complete by the 100th volume. However, U elution was accompanied by the gradual elution of the remaining Pa predominantly between the 35th and 60th volumes. As a result, both the Pa and U were recovered substantially free of Th, 90% of the Pa was recovered essentially free of U, and the U was recovered with minor Pa contamination. Over-all recovery of all three was found to have been substantially quantitative.

While a high degree of fractionation of Pa and U was effected in Example II, there was a minor overlapping of the two chromatographic bands. However, the major portions of the bands were sufficiently separated that with somewhat longer columns, the separation could be made essentially complete. Separation of the nature accomplished in this example is directly applicable to the hereinbefore described Pa-isotope processes, wherein not only the desired Pa isotope but also its valuable U-isotope decay product may each be separately recovered from association with thorium by this single process.

In illustration of protactinium's discovered anionic properties in the presence of HCl, and the relative effect of various HCl concentrations thereon, Example III is presented. In Example III, following, amounts of anion-exchange adsorbent were equilibrated with Pa solutions of different HCl concentrations, and the extent of Pa adsorption was measured.

EXAMPLE III

A series of equilibrations was made in which ca. 20 mg. portions of air-dried Dowex A–1 were agitated for 3 days with 0.100 ml. HCl solutions each containing approximately 12,000 disintegrations/minute of $Pa^{233}$. At the end of the equilibration present, in each instance, the resin was separated from the solution by centrifugation and dried, and both the solution and the separated resin were radiometrically assayed for $Pa^{233}$. As a standard measure for comparison, the results obtained are reported as the distribution coefficient, $Kd$, where:

$$Kd = \frac{\text{Amount Pa per gram resin}}{\text{Amount Pa per ml. solution}}$$

First the actual observed data, and then the graphically averaged and interpolated values for each whole concentration value, are tabulated in Table I below.

Table I.—Distribution of Pa between Dowex A–1 and HCl solutions

[25° C. solution volume = 0.100 ml.]

| M HCl: | Kd |
|---|---|
| A. Data— | |
| 0.9 | 1.9 |
| 0.9 | 2.7 |
| 2.1 | 1.3 |
| 2.1 | 3.2 |
| 4.2 | 3.3 |
| 4.2 | 3.9 |
| 6.0 | 112 |
| 6.0 | 113 |
| 8.4 | 1197 |
| 8.4 | 1693 |
| 10.0 | 1620 |
| 10.0 | 2573 |
| B. Interpolated values— | |
| 1 | 2 |
| 2 | 2.2 |
| 3 | 2.5 |
| 4 | 6 |
| 5 | 10 |
| 6 | 100 |
| 7 | 600 |
| 8 | 1200 |
| 9 | 1500 |
| 10 | 1800 |
| 11 | 2000 |

The marked increase in Pa affinity for the adsorbent at HCl concentrations above 4M is clearly evidenced by the results in Example III. The observation that the distribution coefficients are fairly constant at a low value up to 4M HCl, where they sharply increase, to become again fairly constant at a high value, above about 8M HCl, suggests that two anionic Pa species are involved, with the intervening rise resulting from the transition of one species to the other. Both must, of course, compete with the free chloride ions abundant in the solution for attachment to the adsorbent's active exchange groups. The displacement of the first species from the adsorbent by HCl indicates that it is less strongly adsorbed than $Cl^-$, probably having a single negative charge, the same as $Cl^-$, and having an affinity for the adsorbent not considerably greater than $Cl^-$. This suggests that the first species is $Pa(H_2O)_nCl_6^-$ (where $n=2$ appears probable). As for the second, strongly-adsorbed species, the observed inability of even concentrated HCl solutions to displace it from the adsorbent indicates that it has a negative charge at least as large as 2 and most probably 3, assuming that the maximum co-ordination number of Pa is 8. It can be tentatively assumed, then, that the second species is $PaCl_8^{\equiv}$ (or a basic ion with the same negative charge), which with its triple charge could successfully compete with the singly charged $Cl^-$ for attachment. Apparently, the occurrence of these species results entirely from the hydrolytic and complexing effects obtaining under existing solution conditions, and is not at all dependent upon the particular anion-exchange adsorbent employed. Accordingly, it does not appear that there is any particular criticality in this regard in the choice of an adsorbent from among the conventional types, nor that the HCl concentration requirements will appreciably change among various adsorbents employed.

In conducting these processes, the scale of operations may be of a size ranging from that employing very small laboratory scale adsorption columns to those involving large industrial scale columns up to a foot or more in diameter and several feet in length. Since the basic operation involves merely the contacting of the prepared solution with the adsorbent to selectively adsorb Pa therefrom, virtually any size column will afford operative results. That is, simply, a stream of the solution is percolated through a particular adsorbent mass of whatever amount provided until the limiting capacity for Pa retention of that mass is approached, whereupon further introduction of the feed solution stream is stopped, and elution is commenced. In the special instance where U, as well as Pa, is adsorbed, and chromatographic separation is subsequently effected, the flow of solution should be terminated while the band of adsorbate formed at the top of the column is still very narrow as compared to the depth of the bed (preferably not more than 5% of the bed depth), as is generally conventional in effecting separation by chromatographic elution. Otherwise, excessive overlap of adsorbate bands during the chromatography, with consequent detraction from separation efficiency, may ensue. It is furthermore beneficial for the flow of eluant during the chromatographic separation of Pa and U not to exceed a very slow rate, as is also conventional in the general art of chromatographic elution. Generally speaking, chromatographic eluant flow rates of 3 to 6 cu. in./sq. in./min. have proven satisfactory for the present Pa—U separation. In this regard, it is generally preferred that the flow rate of all solutions, both feed and eluant, during percolation be maintained within this range to advantageously insure that sufficient contact time is afforded for effective adsorption and elution.

The present process is particularly adapted to the improved recovery of Pa-isotopes, and separately their decay-product U-isotopes from admixture with thorium in their conventional production operations mentioned earlier. The Pa recovered in this process is beneficially derived in the form of a readily-utilizable aqueous solution, rather than in a difficultly-soluble precipitate, as in previously-used carrier precipitation operations. Furthermore, the adsorption and elution operations are here more simply controlled by the use of only one single reagent, HCl, at different concentrations, rather than a series of different reagents, as in previously conventional adsorption-elution processes for the purpose. Also, the present process is of greater utility in that it may separately recover both the desired Pa-isotope and its valuable U-isotope decay-product in a single operation. Not the least of these benefits is the process' capability of quantitative recovery and radiometrically-pure separation in a single operation. Accordingly, the present process affords considerable advantage over processes previously conventional in this particular application.

While application of this process to the separation of single Pa isotopes has been particularly emphasized herein, this process has inherently much wider application. For example, it may be applied in the extraction of Pa from pitchblende and other ores, and in the concentration of Pa from dilute solutions. It also has application in the purification of Th from Pa and U contamination, and in the separate recovery of valuable Th isotopes, such as ionium, when admixed with Pa. Even more broadly, however, this invention provides a novel method for rendering Pa anionic and for removing it as such from aqueous solution to the exclusion of other dissolved species which do not exist as anions under the specified conditions. Accordingly, the present invention may be applied to the separation and selective recovery of Pa values away from substances, generally, which do not exist as negatively-charged ions when dissolved in aqueous HCl solutions. One such application is in the recovery for further use of valuable Pa-isotopes after they have become contaminated and admixed with undesirable cationic materials during their use as radioactive tracers. Other applications will become apparent to those skilled in the art.

It is to be understood that all matters contained in the foregoing description and examples shall be interpreted as illustrative and not limitative on the scope of this invention as it is intended to claim the present invention as broadly as possible in view of the prior art. Likewise, it is not intended that this invention be specifically limited to the particular theoretical explanation of the mechanism involved in the discovered phenomena set forth herein.

What is claimed is:

1. A process for the separation and separate recovery of protactinium values from an aqueous solution containing the same together with thorium values, which comprises establishing in the solution a hydrochloric acid concentration substantially within the concentration range of from 4 to 11 molar, contacting the resulting solution with an anion-exchange adsorbent, thereby effecting the adsorption of protactinium values upon the adsorbent while leaving thorium values remaining unadsorbed in the solution, thereafter separating the protactinium-bearing adsorbent from contact with the thorium-containing solution, and subsequently washing the separated protactinium-bearing adsorbent with an aqueous solution of hydrochloric acid in concentration less than 4 molar, thereby eluting protactinium values from the adsorbent.

2. A process for the separation and separate recovery of protactinium values from an aqueous solution containing the same together with thorium values, which comprises establishing in the solution a hydrochloric acid concentration of substantially 8 molar, contacting the resulting solution with an anion-exchange adsorbent, thereby effecting the adsorption of protactinium values upon the adsorbent while leaving thorium values remaining unadsorbed in the solution, thereafter separating the protactinium-bearing adsorbent from contact with the thorium-containing solution, and subsequently washing the separated protactinium-bearing adsorbent with <4M HCl, thereby eluting protactinium values from the adsorbent.

3. An adsorption-chromatographic elution process for the separation and selective recovery of protactinium values and of hexavalent uranium values from an aqueous solution containing the same, which comprises establishing in the solution a hydrochloric acid concentration in excess of approximately 4 molar, percolating the resulting solution, in a single direction, through a bed of anion-exchange adsorbent, thereby effecting adsorption of protactinium values and uranium values upon the adsorption bed, thereafter percolating through the adsorbent bed, in same direction as the flow of solution during adsorption, an aqueous hydrochloric acid solution having a concentration within the approximate range of 3 to 4 molar, thereby separately chromatographically eluting, in succession, protactinium values and then uranium values from the bed, and separately collecting the protactinium-rich and the uranium-rich fractions of eluate.

4. An adsorption-chromatographic elution process for the separation and selective recovery of protactinium values and of hexavalent uranium values from an aqueous solution containing the same together with thorium values, which comprises establishing in the solution a hydrochloric acid concentration of substantially 8 molar, percolating the resulting solution, in a single direction, through a bed of an anion-exchange adsorbent, thereby effecting selective adsorption of protactinium values and uranium values upon the adsorbent bed while leaving thorium values remaining unadsorbed in the solution, thereafter percolating through the adsorbent bed, in the same direction as the flow of solution during adsorption, an aqueous solution of hydrochloric acid in concentration of substantially 3.8 molar, thereby separately chromatographically eluting, in succession, protactinium values and then uranium values from the bed, and separately collecting the protactinium-rich and the uranium-rich fractions of eluate.

5. A process for the separation and selective recovery of a microscopic concentration of protactinium values from an aqueous solution containing the same together with macroscopic bulk of thorium values, which comprises establishing in the solution a hydrochloric acid concentration substantially within the range of 4 to 11 molar, contacting the resulting solution with anion-exchange adsorbent comprising a polystyrene divinyl benzene polymer with quaternary amine radicals as the active exchange groups, thereby effecting the adsorption of protactinium values upon the adsorbent while leaving thorium values remaining unadsorbed in the solution, and thereafter separating the protactinium-bearing adsorbent from contact with the thorium-containing solution, and subsequently washing the separated protactinium-bearing adsorbent with an aqueous solution of hydrochloric acid in concentration less than 4 molar, thereby eluting protactinium values from the adsorbent.

References Cited in the file of this patent

Ayres: Jour. of Amer. Chem. Soc., vol. 69, pp. 2879–2881 (1947).

Thompson: Studies on the Chemistry of Protactinium, AECD–1897, declas. Apr. 15, 1948; available from Technical Information Div., Oak Ridge, Tenn. (AEC), 4 pages.